G. S. STEPHENSON.
FARM IMPLEMENT.
APPLICATION FILED DEC. 4, 1919.
1,364,900.
Patented Jan. 11, 1921.
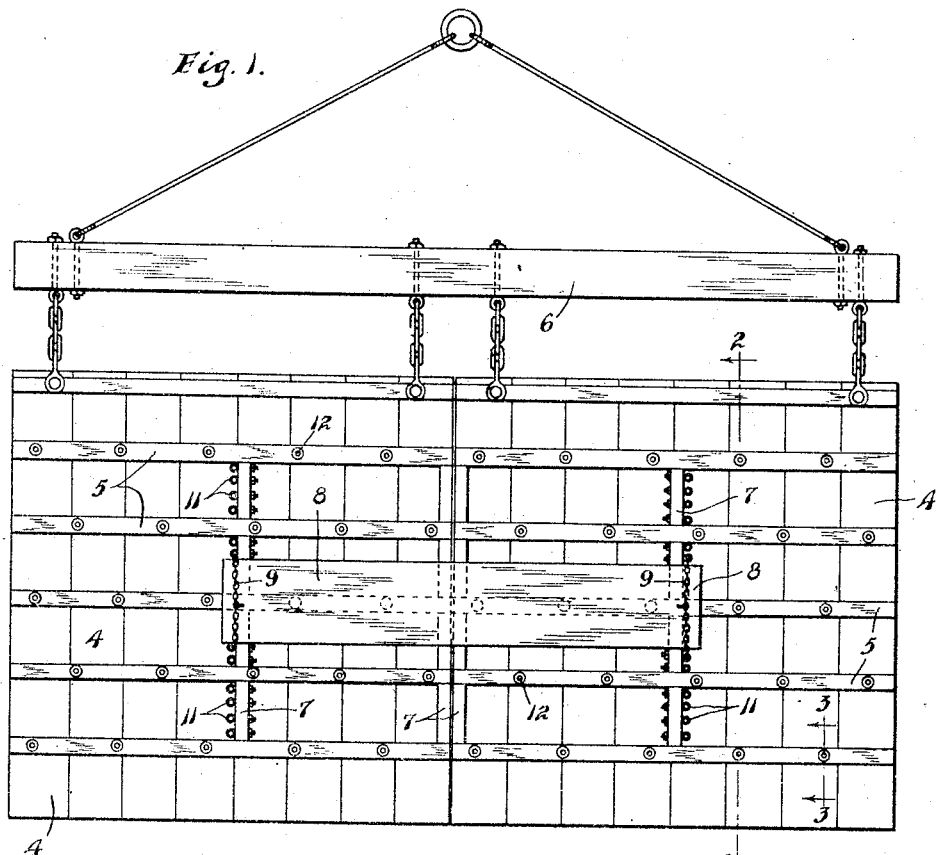
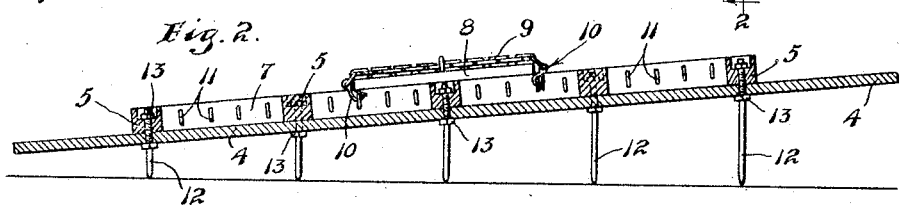
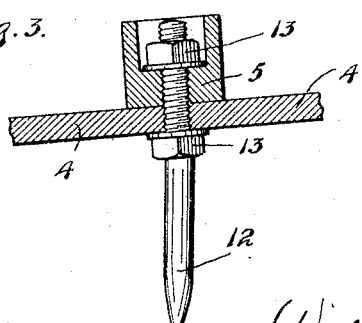
INVENTOR.
GEORGE S. STEPHENSON.
BY HIS ATTORNEYS.

UNITED STATES PATENT OFFICE.

GEORGE S. STEPHENSON, OF LOS ANGELES, CALIFORNIA.

FARM IMPLEMENT.

1,364,900.  Specification of Letters Patent.  Patented Jan. 11, 1921.

Application filed December 4, 1919. Serial No. 342,394.

*To all whom it may concern:*

Be it known that I, GEORGE S. STEPHENSON, a citizen of the United States, residing at Los Angeles, in the county of Los Angeles and State of California, have invented certain new and useful Improvements in Farm Implements; and I do hereby declare the following to be a full, clear, and exact description of the invention, such as will enable others skilled in the art to which it appertains to make and use the same.

My invention relates to farm implements and more particularly to weed gatherers that may be converted into levelers and packers for seed beds.

To the above end, generally stated, the invention consists of the novel devices and combinations of devices hereinafter described and defined in the claims.

In the accompanying drawings, which illustrate the invention, like characters indicate like parts throughout the several views.

Referring to the drawings:—

Figure 1 is a plan view of the improved implement;

Fig. 2 is a view in section taken on the line 2—2 of Fig. 1; and

Fig. 3 is a detail view in section taken on the line 3—3 of Fig. 1.

The numeral 4 indicates a deck having a smooth under-surface and, as shown, comprises a plurality of forwardly and rearwardly extended boards rigidly secured to a plurality of transverse laterally spaced bars 5 placed on top thereof. As shown, there are two of these decks 4 placed side by side and flexibly secured at their front ends to a draft device 6. To the top of each deck 4 is secured a pair of forwardly and rearwardly extended rails 7 made up of short sections inserted between certain of the bars 5. Two of these rails 7 are located at the inner edges of the two decks 4 and the other two thereof are located at substantially the transverse centers of said decks.

A transversely extended foot-board 8, on which an operator may stand, is shiftably supported on the rails 7. The foot-board 8 is adjustably secured to the decks 4 by intermediately securing to each end thereof a short chain 9 having on its ends snaps 10 adapted to be interlocked with longitudinally spaced eye-bolts 11 secured to the outermost rails 7. Obviously, the pressure on the decks may be varied at will by moving the foot-board 8 either forward or backward.

Depending rows of weed-collecting teeth 12 are removably secured to the decks 4 and bars 5 in staggered arrangement and it is important to note that said teeth are progressively shorter from the front to the rear of the decks 4. The upper ends of the teeth 12 are inserted through alined bores in the decks 4 and bars 5, and are provided with screw-threads to receive pairs of opposing nuts 13 for rigidly but detachably securing the teeth to said decks and bars. As best shown in Fig. 3, the uppermost nuts 13 are countersunk in the bars 5 so as to leave the upper faces of said bars smooth to permit free movement of the foot-board 8 thereover when moved on the rails 7.

By making the teeth 12 progressively shorter from the front to the rear of the decks 4, said decks are supported thereby in forwardly inclined positions so that Russian thistles or other weeds, collected by the implement, will freely pass under the decks 4 and be caught by the teeth 12. Under the advanced movement of the implement, the weeds, as collected, are rolled and pressed into compact form, and after the roll of weeds has become a certain size, the implement will pass thereover and leave the roll of weeds where it may be either picked up and placed on a wagon and conveyed from the field, or burned. The size of the rolls of collected weed may be varied at will, depending on the length and nature thereof, by shifting the foot-board 8 either forward or backward. By shifting the foot-board forward, the size of the roll may be made smaller than when shifted rearward for the reason that the weight of the operator standing on the foot-board prevents the forward end of the decks 4 from lifting.

By removing the teeth 12, the decks 4 may be made to rest directly on the ground and the implement used for smoothing and packing seed beds.

What I claim is:—

1. An implement of the kind described comprising a deck with a smooth under-surface and having secured to its top a plurality of transverse bars, and transverse rows of teeth secured to the deck and bars and having their upper ends countersunk in the bars.

2. An implement of the kind described comprising two laterally spaced decks with smooth under-surfaces, a draft device connecting said two decks, and a foot-board supported on the two decks.

3. An implement of the kind described comprising two laterally spaced decks with smooth under-surfaces, a draft device connecting said two decks, a foot-board supported on the two decks, and transverse rows of teeth secured to the decks, said teeth being progressively shorter from the front to the rear of the decks.

4. An implement of the kind described comprising two laterally spaced decks with smooth under-surfaces, a draft device connecting said two decks, and a shiftable foot-board supported on the two decks.

5. An implement of the kind described comprising two laterally spaced decks with smooth under-surfaces, a draft device connecting said two decks, a shiftable foot-board supported on the two decks, and means for securing the foot board to the decks in different adjustments.

6. An implement of the kind described comprising two laterally spaced decks with smooth under-surfaces, a draft device connecting said two decks, forwardly and rearwardly extended rails on the tops of the decks, a foot-board supported on the rails, longitudinally spaced eyes secured to the rails, and flexible connections intermediately secured to the ends of the foot-board and having on their ends hooks adapted to be interlocked with certain pairs of said eyes to secure the foot-board to the rails in different adjustments.

In testimony whereof I affix my signature in presence of two witnesses.

GEORGE S. STEPHENSON.

Witnesses:
RAE BLACKSTOCK,
ETHEL I. HUMMER.